Oct. 7, 1952 W. A. KELSO 2,613,047
ANTIBACKLASH FISHING DEVICE
Filed April 25, 1947
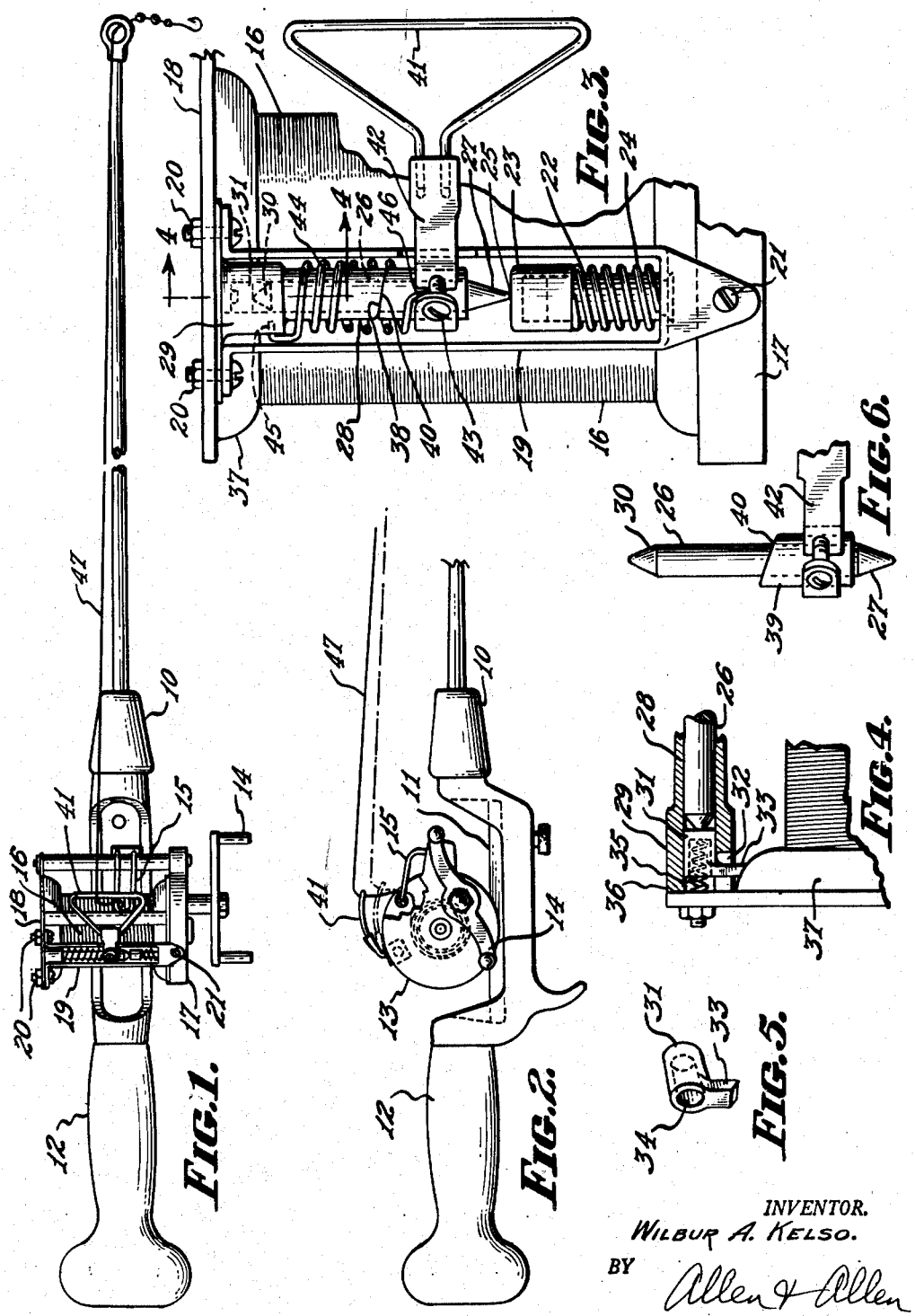
INVENTOR.
WILBUR A. KELSO.
BY Allen & Allen
ATTORNEYS.

Patented Oct. 7, 1952

2,613,047

UNITED STATES PATENT OFFICE 2,613,047

ANTIBACKLASH FISHING DEVICE

Wilbur A. Kelso, Cincinnati, Ohio

Application April 25, 1947, Serial No. 743,984

3 Claims. (Cl. 242—84.5)

This invention relates to an anti-backlash device for fishing reels or the like. Modern fishing reels are usually provided with very smooth running bearings, so that when a cast is made the reel will unwind very rapidly so that the optimum distance may be obtained in casting. When the bait strikes the water and there is no longer any tension in the fishing line, the momentum in the reel will cause it to continue unreeling with the result that the line will become tangled on the reel. An experienced fisherman could overcome this difficulty by "thumbing" the reel to halt its spinning tendency as soon as the bait hits the water. For a beginner however, and even for an experienced fisherman, early in the season this procedure tends to be hard on the thumb.

There have been devices on the market in the past whereby a brake could be applied to the reel for the purpose outlined above where the brake was manually actuated. All this did was to reduce wear and tear on the thumb. It still required a nice sense of timing on the part of the fisherman to get the most out of his cast without getting his line tangled.

It is an object of my present invention to provide an anti-backlash device for fishing reels which is entirely automatic in operation and in which the brake is controlled by tension or absence of tension in the fishing line. It is another object of my invention to provide such a device which in no way interferes with the mechanism of the reel. A further object of my invention is the provision of a device of the nature outlined above which can be manufactured as a self-contained separate accessory which can be purchased by a fisherman and attached to his favorite reel. It is a still further object of my invention to provide a device having a normally set brake, which brake is freed the instant there is tension on the line and which is automatically reset the instant tension on the line is relieved, as for instance, when the bait hits the water.

These and other objects of my invention which will be pointed out in more detail hereinafter or which will be apparent to one skilled in the art upon reading these specifications, I accomplish by that construction and arrangement of parts of which I shall now describe an exemplary embodiment.

Reference is made to the drawings forming a part hereof and in which:

Fig. 1 is a plan view of a fishing rod and reel embodying my invention.

Fig. 2 is a fragmentary side elevation thereof.

Fig. 3 is a view of the reel similar to Fig. 1 on a greatly enlarged scale.

Fig. 4 is a fragmentary cross sectional view taken on the line 4—4 of Fig. 3.

Fig. 5 is a perspective view of the brake shoe element.

Fig. 6 is a detail view of the main shaft and its associated parts.

Briefly in the practice of my invention, I provide in connection with a conventional fishing reel a frame within which substantially all operative parts of the device are embraced. This device may, of course, be installed on the reel at the factory or it may be provided as a separate accessory, which can readily be attached by the purchaser to his favorite reel. I provide a brake shoe in a position where it can bear against a rotating part of the reel and I provide a line contacting element comprising a loop through which the fishing line is threaded. The line contacting element is mounted on a rockable shaft and has its loop so positioned that tension on the line will cause the shaft to rotate slightly. Spring means are provided to bias the shaft in the opposite direction to set the brake.

Referring more specifically to the drawing, I have shown a fishing rod, indicated generally at 10, which may be of any desired style. Mounted as by means of a bracket 11 adjacent the hand grip portion 12, I provide a reel indicated generally at 13. This reel is provided with a winding crank 14 and a level winding device 15, all as well known in the art. The fishing line is wound on the reel, as at 16, and passes through the eye of the level winder 15 in the usual way.

On fixed parts of the reel, as the back gear housing 17 and the end frame 18, I mount a frame, indicated generally at 19, as by means of the screws 20 and 21.

In one end of the frame 19, I provide a boss 22 covered by a cap 23, which is urged upwardly, as seen in Fig. 3, by the helical spring 24. A main shaft 26 is provided with a conical pivot element 27 arranged to pivot on the surface of the cap 23 as at 25 and has its bearing in a sleeve 28 extending from the boss 29 at the upper end of Fig. 3. The other end of the shaft 26 has the conical pivot 30 which bears on the surface of the brake shoe member 31, which is disposed within the boss 29. The boss 29 has the cut-out portion 32 for the passage of the brake shoe itself, indicated at 33. The element 31 has a counter-bore 34 within which a small helical spring 35 is disposed, bearing against the side wall 18 of the reel and the inside of the member 31, thus tending to move the shoe 33 out of engagement with the rim 37 of the reel.

The sleeve 28 terminates in a helical cam surface 38 and the shaft 26 has secured to it a sleeve 39 which has a helical cam surface 40. The line contacting loop 41 is secured to the sleeve 39 by means of a bracket, indicated generally at 42, which is securely clamped to the sleeve 39 as by the screw 43. A helical spring 44 has one end secured to the boss 29, as at 45, and has its other end secured to the bracket 42, as at 46.

From the foregoing detailed description, it will be seen that the bracket 42 with its associated loop 41 can rock, rotating the shaft 26 in its bearings at 25 and 30. The spring 44 is so disposed that it tends to rock the shaft 26 in a counterclockwise direction, as seen in Fig. 2, or so that the loop will move toward the reader, as seen in Fig. 3. In this position the parts occupy the positions shown in solid lines in the figures and the spring 22 urges the shaft 26 and the brake shoe element 31 into braking position.

If now the loop 41 is slightly depressed, as seen in Fig. 3 or moved to the dotted line position of Fig. 2, the camming action between the cam surfaces 38 and 40 causes the shaft 26 to move downwardly in Fig. 3 against the tension of the spring 22. The rocking motion, of course, is against the tension of the spring 44. As seen in Fig. 4 this movement is a movement to the right of the shaft 26, and it will be clear from a consideration of this figure that as the shaft 26 moves to the right, the spring 35 can force the brake shoe 33 out of engagement with the rim 37 of the reel.

The rocking motion of the loop 41 is produced as shown in Fig. 2 by a tension in the line. The line, indicated at 47 after passing through the level winding eye 15 is threaded through the loop 41. When tension is put on the line 47, the line and the member 41 assume the dotted line position, shown in Fig. 2, which through the linkage described above frees the brake shoe 33 from contact with the reel rim 37. The instant the bait hits the water and tension is relieved in the line 47, the member 41 returns to the position shown in solid lines in Fig. 2 under the influence of the spring 44 whereupon the brake is applied by the spring 22 through the cap 23 and the shaft 26 against the pressure of the relatively weaker spring 35.

From the foregoing description, it will be clear that I have provided an anti-backlash device, which is wholly self-contained, so that it in no way interferes with the mechanism of the reel itself. The device may be factory installed on reels, or it may be sold as an accessory which the purchaser can himself attach to his own favorite reel in a minimum of time. It will also be clear that my device requires no adjustment for different weights of bait, and operates equally well, regardless of the type of bait used.

It will be clear that numerous modifications may be made without departing from the spirit of my invention and therefore I do not intend to limit myself, except as pointed out in the claims which follow.

Having now fully described my invention what I claim as new and desire to secure by Letters Patent is:

1. As an article of manufacture, a self-contained anti-backlash device attachable to a conventional fishing reel, comprising a frame having attaching elements at each end whereby it can be attached to the two side walls of a fishing reel in a position within the lateral confines of said reel, a sleeve fixedly mounted in said frame, a shaft rockably mounted in said sleeve, a shoulder on said shaft, the mutually opposed surfaces of said sleeve and shoulder being of helical conformation whereby rocking motion of said shaft produces axial motion of said shaft, a brake shoe associated with said shaft in a position to bear against a rotating part of said reel in one position of said shaft, and line contacting means secured to said shaft to rock the same under the influence of tension on said line to move said shaft axially to another position in which said brake shoe clears said rotating part of said reel.

2. A device according to claim 1 in which torsion spring means are provided to urge said shaft to rock in a direction to apply said brake shoe to said rotating parts of said reel.

3. A device according to claim 1 in which spring means are provided to maintain said helical surfaces in contact with each other.

WILBUR A. KELSO.

REFERENCES CITED

The following references are of record in the file of this patent:

UNITED STATES PATENTS

| Number | Name | Date |
|---|---|---|
| 506,094 | Boardman | Oct. 3, 1893 |
| 1,892,541 | Smelser | Dec. 27, 1932 |
| 2,205,641 | Wilson | June 25, 1940 |
| 2,261,610 | Yarosz | Nov. 4, 1941 |

FOREIGN PATENTS

| Number | Country | Date |
|---|---|---|
| 607,679 | France | Apr. 3, 1926 |